United States Patent
Kim et al.

(10) Patent No.: US 8,923,416 B2
(45) Date of Patent: Dec. 30, 2014

(54) SYMBOL-LEVEL REPETITION CODING IN POWER LINE COMMUNICATIONS

(75) Inventors: Il Han Kim, Dallas, TX (US); Badri N. Varadarajan, Mountain View, CA (US); Anand G. Dabak, Plano, TX (US)

(73) Assignee: Texas Instruments Incorporation, Dallas, TX (US)

( * ) Notice: Subject to any disclaimer, the term of this patent is extended or adjusted under 35 U.S.C. 154(b) by 252 days.

(21) Appl. No.: 13/267,300

(22) Filed: Oct. 6, 2011

(65) Prior Publication Data

US 2012/0099628 A1    Apr. 26, 2012

Related U.S. Application Data

(60) Provisional application No. 61/405,423, filed on Oct. 21, 2010.

(51) Int. Cl.
*H04B 3/00* (2006.01)
*H03H 7/30* (2006.01)
*H04W 4/00* (2009.01)
*H04B 3/54* (2006.01)
*H04L 1/08* (2006.01)
*H04L 1/00* (2006.01)

(52) U.S. Cl.
CPC .......... *H04L 1/08* (2013.01); *H04B 2203/5425* (2013.01); *H04B 3/54* (2013.01); *H04B 2203/5433* (2013.01); *H04L 1/0065* (2013.01); *H04L 1/0059* (2013.01); *H04B 3/546* (2013.01); *H04B 2203/5466* (2013.01); *H04B 2203/5408* (2013.01)
USPC .............................. 375/257; 375/231; 370/328

(58) Field of Classification Search
USPC .................................. 375/257, 231; 370/328
See application file for complete search history.

(56) References Cited

U.S. PATENT DOCUMENTS

| | | | | |
|---|---|---|---|---|
| 4,815,106 A | * | 3/1989 | Propp et al. ................... | 375/257 |
| 6,985,714 B2 | * | 1/2006 | Akiyama et al. .............. | 455/402 |
| 7,146,191 B2 | * | 12/2006 | Kerner et al. ................. | 455/558 |
| 7,269,215 B2 | * | 9/2007 | Kaku et al. .................... | 375/231 |
| 2002/0016180 A1 | * | 2/2002 | Derosier et al. .............. | 455/522 |
| 2003/0128746 A1 | * | 7/2003 | Lerner et al. .................. | 375/148 |
| 2003/0129978 A1 | * | 7/2003 | Akiyama et al. .............. | 455/426 |
| 2004/0131025 A1 | * | 7/2004 | Dohler et al. ................. | 370/328 |
| 2004/0240575 A1 | * | 12/2004 | Rainbolt ....................... | 375/267 |
| 2005/0159184 A1 | * | 7/2005 | Kerner et al. ................. | 455/558 |
| 2009/0307541 A1 | * | 12/2009 | Razazian et al. ............. | 714/701 |

* cited by examiner

*Primary Examiner* — Chieh M Fan
*Assistant Examiner* — Sarah Hassan
(74) *Attorney, Agent, or Firm* — Steven A. Shaw; Frederick J. Telecky, Jr.

(57) ABSTRACT

Systems and methods for implementing symbol-level repetition coding in power line communications (PLC) are described. In some embodiments, these systems and methods may provide reliable communication in severe channel environments of PLC networks, at least in part, by changing the forward error correction (FEC) used by various devices operating within current PLC systems. For example, a method may include receiving a PLC signal and applying convolutional encoding to the received signal, the convolutional encoding producing an encoded signal. The method may also include performing a subcarrier modulation operation upon the encoded signal, the subcarrier modulation operation producing a modulated signal. The method may further include applying symbol-level repetition coding to the modulated signal, the symbol-level repetition coding producing a repetitious signal. In some cases, one or more distinct repetition patterns may be applied to different symbols or portions thereof. The repetitious signal may then be transmitted over a power line.

12 Claims, 5 Drawing Sheets

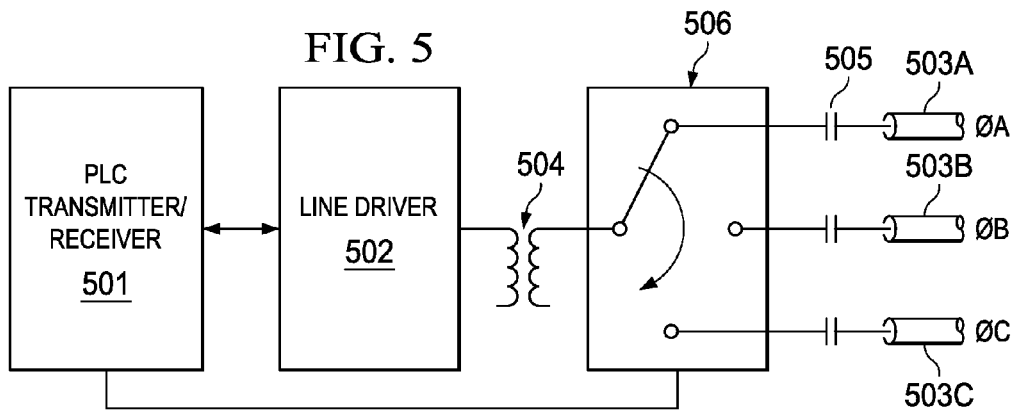
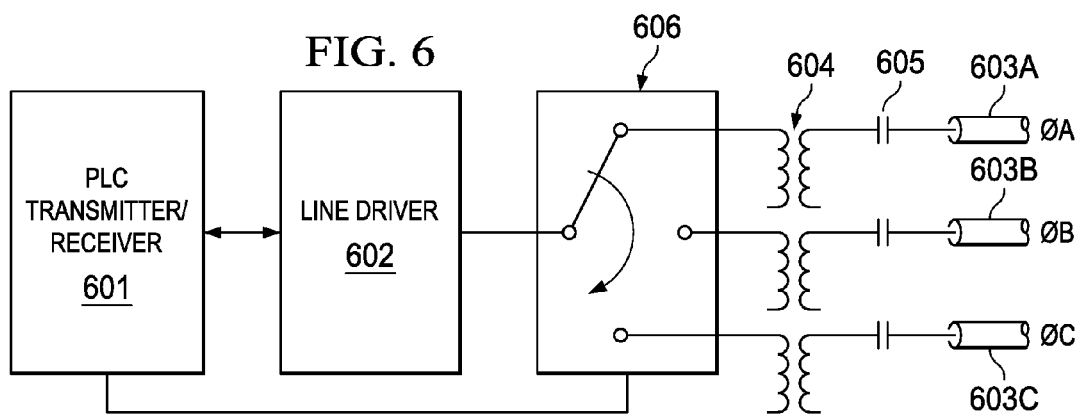
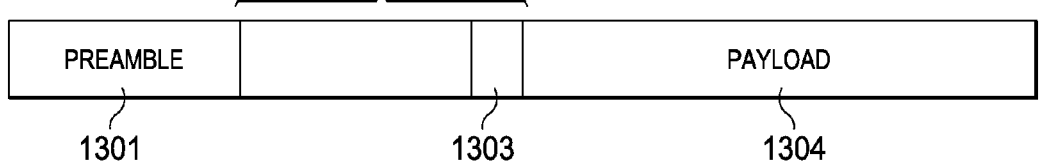

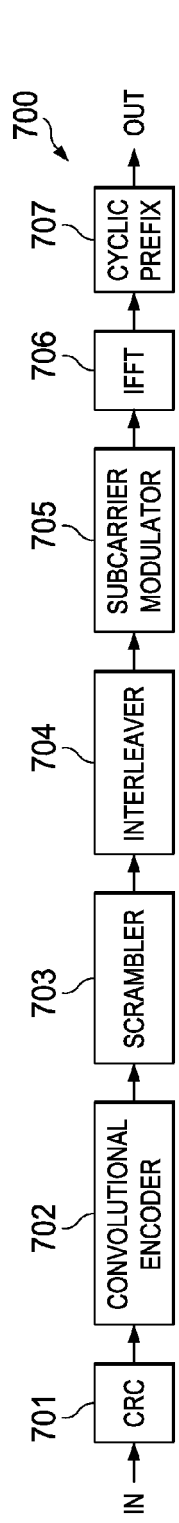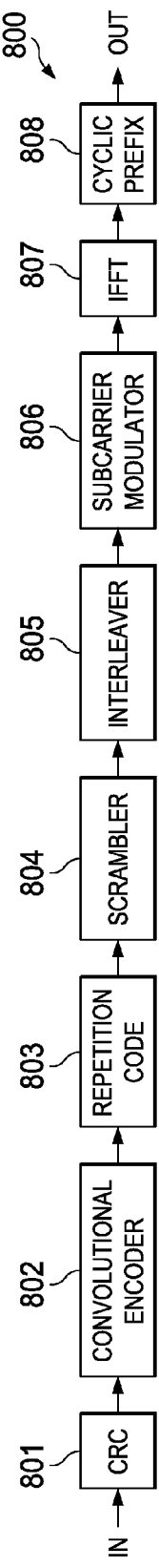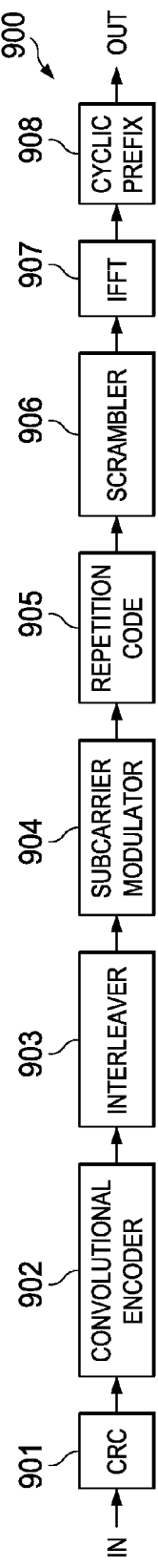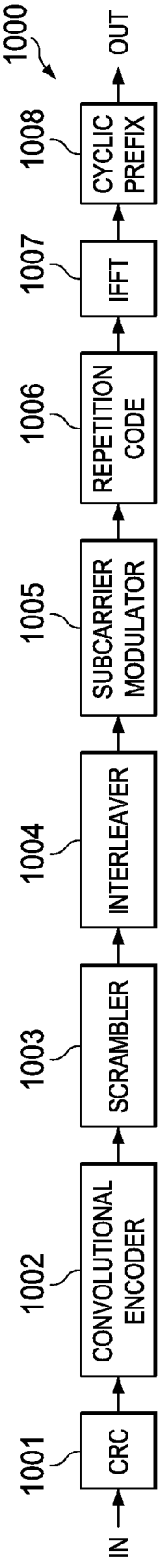
FIG. 7 (PRIOR ART)
FIG. 8
FIG. 9
FIG. 10

SYMBOL-LEVEL REPETITION CODING IN POWER LINE COMMUNICATIONS

CROSS-REFERENCE TO RELATED APPLICATIONS

This application claims the benefit of the filing date of U.S. Provisional Patent Application No. 61/405,423, which is titled "Method to Trade Linearity for Power in Current Steering Digital to Analog Converter Based Line Drivers Using Variable Class Mode Operation" and was filed Oct. 21, 2010, the disclosure of which is hereby incorporated by reference herein in its entirety.

TECHNICAL FIELD

Embodiments are directed, in general, to power line communications, and, more specifically, to systems and methods for implementing symbol-level repetition coding in power line communications.

BACKGROUND

Power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

Various PLC standardizing efforts are currently being undertaken around the world, each with its own unique characteristics. Generally speaking, PLC systems may be implemented differently depending upon local regulations, characteristics of local power grids, etc. Examples of competing PLC standards include the IEEE 1901, HomePlug AV, and ITU-T G.hn (e.g., G.9960 and G.9961) specifications. Another standardization effort includes, for example, the Powerline-Related Intelligent Metering Evolution (PRIME) standard designed for OFDM-based (Orthogonal Frequency-Division Multiplexing) communications. The current or existing PRIME standard referred to herein is the PRIME R1.3E Draft Standard prepared by the PRIME Alliance Technical Working Group ("PRIME R1.3E") and earlier versions thereof.

The inventors hereof have determined that, generally speaking, existing PLC systems and proposed standards operate well on low voltage (LV) power lines. However, the channel environments are more severe on medium voltage (MV) lines. For instance, MV lines have higher background noise power than LV lines and, therefore, reliable communication may sometimes not be possible on those lines.

SUMMARY

Systems and methods for implementing symbol-level repetition coding in power line communications (PLC) are disclosed. In some embodiments, a method may include receiving a signal to be transmitted over a power line. The method may include applying convolutional encoding to the received signal, the convolutional encoding producing an encoded signal. The method may also include performing a subcarrier modulation operation upon the encoded signal, the subcarrier modulation operation producing a modulated signal. The method may further include applying symbol-level repetition coding to the modulated signal, the symbol-level repetition coding producing a repetitious signal. Then, the repetitious signal may be transmitted over a power line.

In some implementations, the method may include interleaving the encoded signal to produce an interleaved signal prior to performing the subcarrier modulation operation, and performing the subcarrier modulation operation upon the interleaved signal. The method may also include scrambling the repetitious signal prior to causing the repetitious signal to be transmitted over the power line. Further, the method may include applying a scrambler shift corresponding to a PLC domain, the scrambler shift being different from another scrambler shift corresponding to another PLC domain.

In other implementations, the method may include scrambling the encoded signal to produce a scrambled signal, interleaving the scrambled signal to produce an interleaved signal prior to performing the subcarrier modulation operation, and performing the subcarrier modulation operation upon the interleaved signal. Again, a scrambler shift corresponding to a PLC domain and different from another scrambler shift corresponding to another PLC domain may be used.

In some cases, the received signal may include a header portion indicating a repetition mode, the symbol-level repetition coding producing the repetitious signal corresponding to the repetition mode. For example, in some embodiments, applying the symbol-level repetition coding to the modulated signal may include applying a repetitive pattern to a first set of symbols within the modulated signal for an N number of times, wherein N is an integer, and applying the repetitive pattern to a second set of symbols within the modulated signal for the N number of times, the second set of symbols occurring later in time than the first set of symbols. In other embodiments, applying the symbol-level repetition coding to the modulated signal may include applying a first repetitive pattern to a first set of symbols within the modulated signal, and applying a second repetitive pattern to a second set of symbols within the modulated signal. For example, the second set of symbols may occur later in time than the first set of symbols, and the second repetitive pattern may be different from the first repetitive pattern.

In yet other embodiments, applying the symbol-level repetition coding to the modulated signal may include applying a first repetitive pattern to a first portion of a first set of repeated symbols within the modulated signal and applying a second repetitive pattern to a second portion of the first set of repeated symbols within the modulated signal, where the second portion of the first set of repeated symbols occurs later in time than the first portion of the first set of repeated symbols. It may also include applying the first repetitive pattern to a first portion of a second set of repeated symbols within the modulated signal, where the first portion of the second set of repeated symbols occurs later in time than the second portion of the first set of repeated symbols. And it may also include applying the second repetitive pattern to a second portion of the second set of repeated symbols within the modulated signal, where the second portion of the second set of repeated symbols occurs later in time than the first portion of the second set of repeated symbols, and the second repetitive pattern different from the first repetitive pattern.

In some implementations, one or more of the techniques described herein may be performed by one or more computer systems. In other implementations, a tangible computer-readable storage medium may have program instructions stored thereon that, upon execution by one or more computer systems, cause the one or more computer systems to execute one or more operations disclosed herein. In yet other implementations, a system (e.g., a PLC modem) may include at least one processor and a memory coupled to the at least one processor. Examples of a processor include, but are not limited to, a digital signal processor (DSP), an application specific integrated circuit (ASIC), a system-on-chip (SoC) circuit, a field-programmable gate array (FPGA), a microprocessor, or a microcontroller. The memory may be configured to store program instructions executable by the at least one processor to cause the system to execute one or more operations disclosed herein.

BRIEF DESCRIPTION OF THE DRAWINGS

Figure 1:
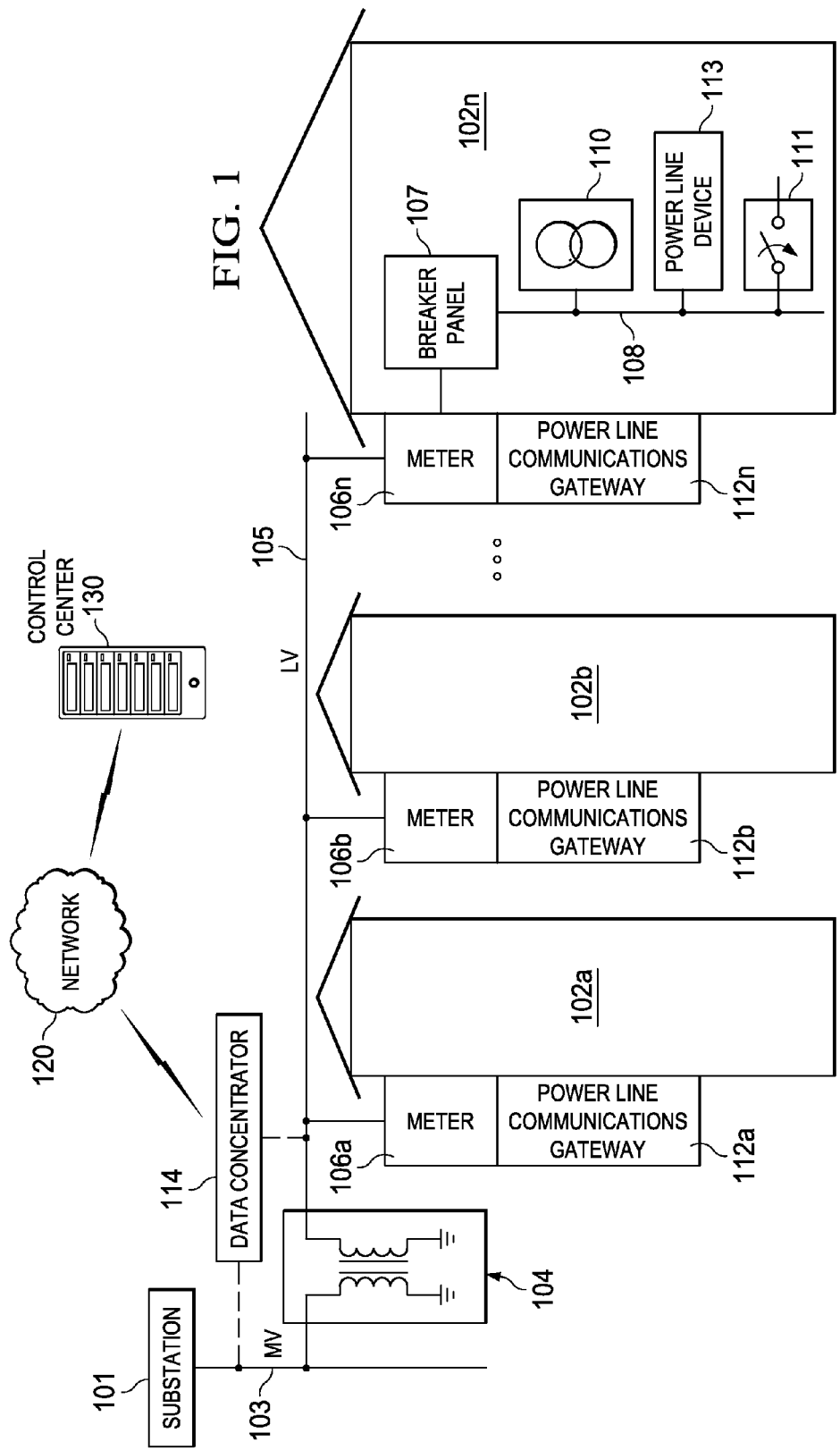

Having thus described the invention(s) in general terms, reference will now be made to the accompanying drawings, wherein:

FIG. 1 is a diagram of a PLC environment according to some embodiments.

Figure 2:
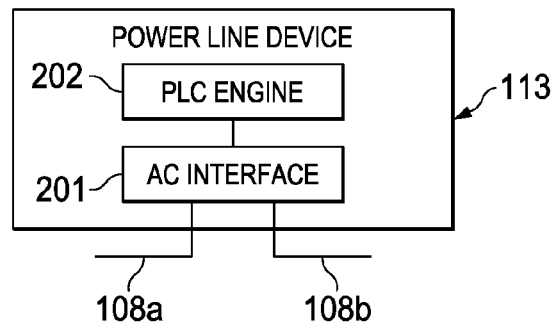

FIG. 2 is a block diagram of a PLC device or modem according to some embodiments.

Figure 3:
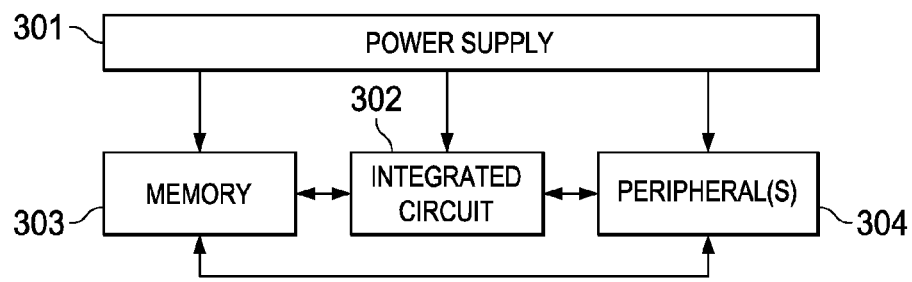

FIG. 3 is a block diagram of an integrated circuit according to some embodiments.

Figure 4:
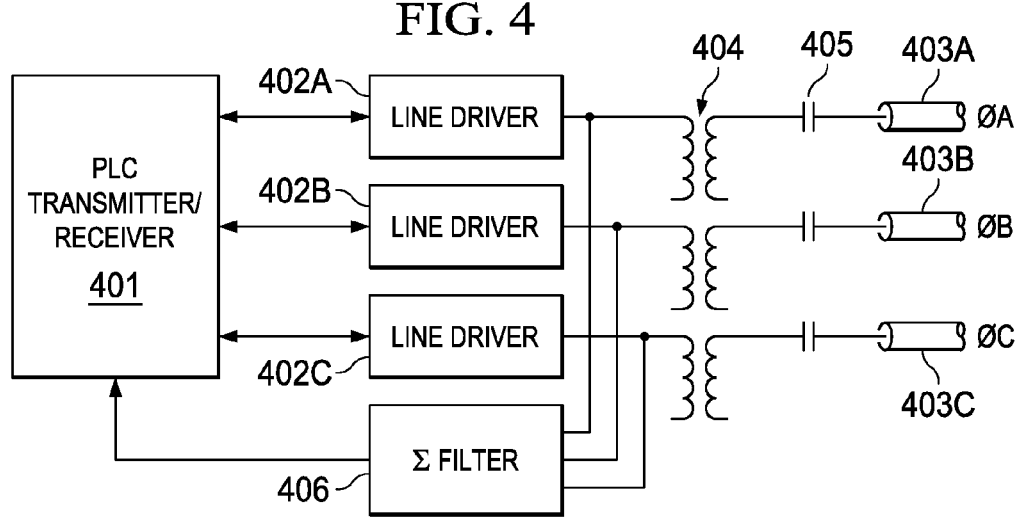

FIGS. 4-6 are block diagrams illustrating alternative connections between a power line communications transmitter and/or receiver circuitry to three-phase power lines according to some embodiments.

FIG. 7 is a block diagram of the components of a prior art physical layer (PHY) transmitter according to the PRIME R1.3E draft standard.

FIG. 8 is a block diagram of the components of a PHY transmitter using a bit-level repetition code at the output of a convolutional encoder according to some embodiments.

FIG. 9 is a block diagram of the components of a PHY transmitter using a symbol-level repetition code between a subcarrier modulator and a scrambler according to some embodiments.

FIG. 10 is a block diagram of the components of a PHY transmitter using a symbol-level repetition code between a subcarrier modulator and an inverse fast Fourier transform (IFFT) block according to some embodiments.

Figure 11:
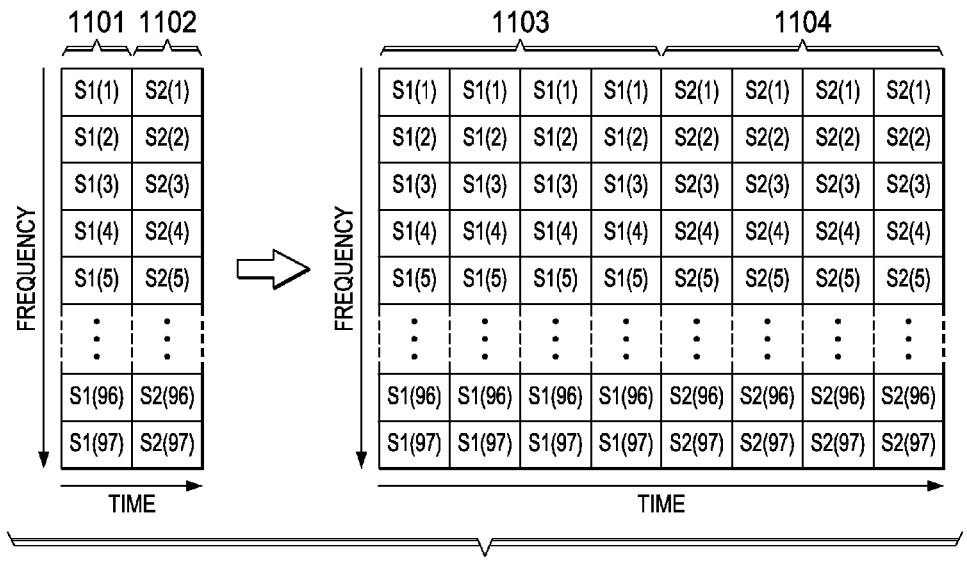

FIG. 11 is a diagram of a first symbol-based coding scheme according to some embodiments.

Figure 12:
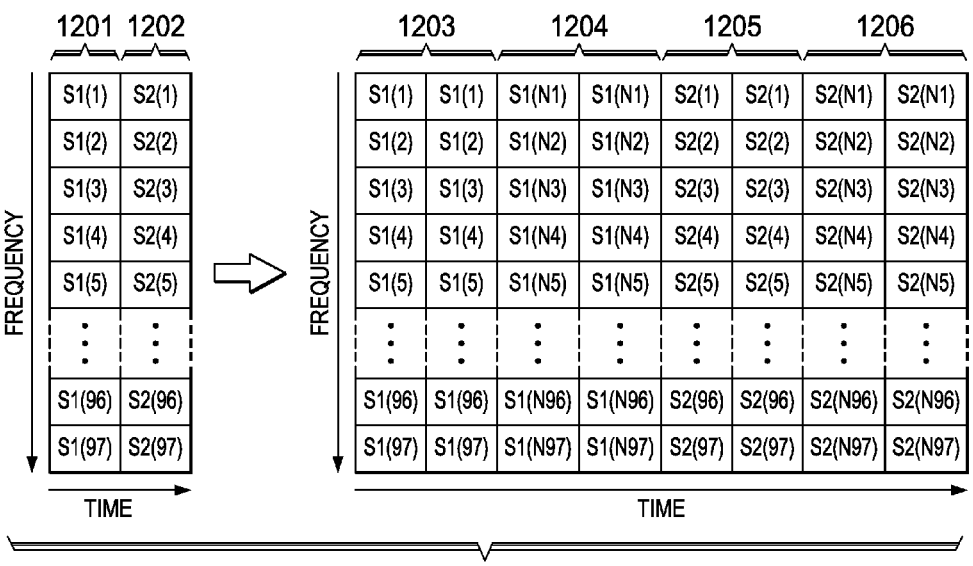

FIG. 12 is a diagram of another symbol-based coding scheme according to some embodiments.

FIG. 13 is a diagram of a data frame according to some embodiments.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

As recognized by the inventors hereof, a problem with using a power line network as a communications medium is that the power lines are subject to noise and interference. Power line cables are susceptible, for example, to noise from AM band broadcast radio signals, maritime communications, and electrical equipment coupled to the power lines. Noise propagates along the power lines and combines with communications signals, which may corrupt the communications signals. Another problem with using power line networks is caused by the structure of the cable (i.e., the propagation medium). On MV and LV power lines, the inner section of the cable comprises a group of phase lines, each carrying one of the three supply phases. At radio frequencies, the capacitance between these separate lines causes the signals on one line to leak or couple onto the neighboring lines. The coupling process between phase lines may introduce a phase shift or other interference. Therefore, after propagating along the lines, the components of a communications signal on each line will no longer be in phase with each other, but will be of different phase and amplitude. Such coupling and interference cause problems with receiving equipment, which must attempt to decode the modified received signal and reconstruct the original signal.

Accordingly, various embodiments described herein may provide more reliable communication in the severe channel environments of PLC networks by changing the forward error correction (FEC) used in current systems (e.g., the PRIME system, etc.). In some implementations, coding systems and methods described herein may coexist with any suitable standard (e.g., PRIME R1.3E draft) without requiring major changes to the underlying systems employing those standards. This specification describes, among other things, modifications to aspects of the physical (PHY) layer and/or the media access control (MAC) layer of PLC's open system interconnection (OSI) model. This specification also describes, among other things, concatenated symbol-level repetition coding techniques that address problems associated with transmitting PLC signals over noisy MV and LV power lines. A PHY layer Protocol Data Unit (PPDU) format that is backward compatible with other standards is also described herein.

Turning now to FIG. 1, an electric power distribution system is depicted according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. (Although referred to as "residences," premises 102a-n may include any type of building, facility or location where electric power is received and/or consumed.) A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like.

PLC modems or gateways 112a-n at residences 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more data concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

In some embodiments, each concentrator 114 may be seen as a based node for a PLC domain, each such domain comprising downstream PLC devices that communicate with control center 130 through a respective concentrator 114. For example, in FIG. 1, device 106a-n, 112a-n, and 113 may all be considered part of the PLC domain that has data concentrator 114 as its base node; although in other scenarios other devices may be used as the base node of a PLC domain. In a typical situation, multiple nodes may be deployed in a given PLC network, and at least a subset of those nodes may be tied to a common clock through a backbone (e.g., Ethernet, digital subscriber loop (DSL), etc.).

Still referring to FIG. 1, meter 106, gateways 112, PLC device 113, and data concentrator 114 may each be coupled to or otherwise include a PLC modem or the like. The PLC modem may include transmitter and/or receiver circuitry to facilitate the device's connection to power lines 103, 105, and/or 108.

FIG. 2 is a block diagram of PLC device or modem 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. As noted above, in some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data aggregators 114, etc.) for further processing. Conversely, PLC engine 202 may receive instructions and/or other information from such higher-level PLC devices encoded in PLC signals, for example, to allow PLC engine 202 to select a particular frequency band in which to operate.

In various embodiments, PLC device 113 may be implemented at least in part as an integrated circuit. FIG. 3 is a block diagram of such an integrated circuit. In some cases, one or more of meter 106, gateway 112, PLC device 113, or data concentrator 114 may be implemented similarly as shown in FIG. 3. For example, integrated circuit 302 may be a digital signal processor (DSP), an application specific integrated circuit (ASIC), a system-on-chip (SoC) circuit, a field-programmable gate array (FPGA), a microprocessor, a microcontroller, or the like. As such, integrated circuit 302 may implement, at least in part, at least a portion of PLC engine 202 shown in FIG. 2. Integrated circuit 302 is coupled to one or more peripherals 304 and external memory 303. Further, integrated circuit 302 may include a driver for communicating signals to external memory 303 and another driver for communicating signals to peripherals 304. Power supply 301 is also provided which supplies the supply voltages to integrated circuit 302 as well as one or more supply voltages to memory 303 and/or peripherals 304. In some embodiments, more than one instance of integrated circuit 302 may be included (and more than one external memory 303 may be included as well).

Peripherals 304 may include any desired circuitry, depending on the type of PLC device or system. For example, in some embodiments, peripherals 304 may implement, at least in part, at least a portion of a PLC modem (e.g., portions of AC interface 210 shown in FIG. 2). Peripherals 304 may also include additional storage, including RAM storage, solid-state storage, or disk storage. In some cases, peripherals 304 may include user interface devices such as a display screen, including touch display screens or multi-touch display screens, keyboard or other input devices, microphones, speakers, etc.

External memory 303 may include any type of memory. For example, external memory 303 may include SRAM, non-volatile RAM (NVRAM, such as "flash" memory), and/or dynamic RAM (DRAM) such as synchronous DRAM (SDRAM), double data rate (DDR, DDR2, DDR3, etc.) SDRAM, Rambus® DRAM, etc. External memory 303 may include one or more memory modules to which the memory devices are mounted, such as single inline memory modules (SIMMs), dual inline memory modules (DIMMs), etc.

In various implementations, PLC device or modem 113 may include transmitter and/or receiver circuits configured to connect to power lines 103, 105, and/or 108. FIG. 4 illustrates the connection between the power line communication transmitter and/or receiver circuitry to the power lines according to some embodiments. PLC transmitter/receiver 401 may function as the transmitter and/or receiver circuit. PLC transmitter/receiver 401 generates pre-coded signals for transmission over the power line network. Each output signal, which may be a digital signal, is provided to a separate line driver circuit 402A-C. Line drivers 402A-C comprise, for example, digital-to-analog conversion circuitry, filters, and/or line drivers that couple signals from PLC transmitter/receiver 401 to power lines 403A-C. Transformer 404 and coupling capacitor 405 link each analog circuit/line driver 402 to its respective power line 403A-C. Accordingly, in the embodiment illustrated in FIG. 4, each output signal is independently linked to a separate, dedicated power line.

FIG. 4 further illustrates an alternate receiver embodiment. Signals are received on power lines 403A-C, respectively. In an embodiment, each of these signals may be individually received through coupling capacitors 405, transformers 404, and line drivers 402 to PLC transmitter/receiver 401 for detection and receiver processing of each signal separately. Alternatively, the received signals may be routed to summing filter 406, which combines all of the received signals into one signal that is routed to PLC transmitter/receiver 401 for receiver processing.

FIG. 5 illustrates an alternative embodiment in which PLC transmitter/receiver 501 is coupled to a single line driver 502, which is in turn coupled to power lines 503A-C by a single transformer 504. All of the output signals are sent through line driver 502 and transformer 504. Switch 506 selects which power line 503A-C receives a particular output signal. Switch 506 may be controlled by PLC transmitter/receiver 501. Alternatively, switch 506 may determine which power line 503A-C should receive a particular signal based upon information, such as a header or other data, in the output signal. Switch 506 links line driver 502 and transformer 504 to the selected power line 503A-C and associated coupling capacitor 505. Switch 506 also may control how received signals are routed to PLC transmitter/receiver 501.

FIG. 6 is similar to FIG. 5 in which PLC transmitter/receiver 1901 is coupled to a single line driver 1902. However, in the embodiment of FIG. 6, power lines 603A-C are each coupled to a separate transformer 604 and coupling capacitor 605. Line driver 602 is coupled to the transformers 604 for each power line 603 via switch 606. Switch 606 selects which transformer 604, coupling capacitor 605, and power line 603A-C receives a particular signal. Switch 606 may be controlled by PLC transmitter/receiver 601, or switch 606 may determine which power line 603A-C should receive a particular signal based upon information, such as a header or other data, in each signal. Switch 606 also may control how received signals are routed to PLC transmitter/receiver 601.

In various embodiments, the circuits described above may be configured to implement signal processing operations upon a PLC signal to be transmitted over a power line. FIG. 7 illustrates a PRIME PHY R1.3E transmitter 700 according to the existing PRIME standard. Such a transmitted may be implemented, for example, by PLC modem 113 shown in FIGS. 1 and 2. The PHY layer receives PPDU inputs from the Media Access Control (MAC) layer. The PPDU passes through cyclic redundancy check (CRC) block 701 and then is convolutionally encoded in convolutional encoder 702 and scrambled in Scrambler 703. The output of Scrambler 703 is interleaved in interleaver 704 and then differentially modulated in subcarrier modulator 705. The modulation uses a Differential Binary Phase Shift Keying (DBPSK), Differential Quaternary Phase Shift Keying (DQPSK) or Differential Eight-Phase Shift Keying (DBPSK) scheme. OFDM is performed in Inverse Fast Fourier Transform (IFFT) block 706 and the cyclic prefix generator 702. The forward error correction (FEC) in transmitter 700 is rate ½ convolutional coding with the constraint length 7.

It has been shown that the transmission methods described in the existing PRIME standard, such as the modulation and coding employed in transmitter 700, works well in typical LV networks. However, the inventors hereof have recognized that some changes are needed to enhance the performance in severe channel environments, such as in the noisier MV networks. Specifically, another modulation and coding scheme (MCS) can be added to the PRIME standard to reduce the lowest tolerable signal-to-noise ratio (SNR) for reliable communications. However, the proposed change to the modulation and coding scheme may result in a reduced data rate.

The present PRIME standard supports six MCS: DBPSK, DQPSK or DBPSK modulations, each either with or without a rate ½ convolutional code. It has been observed that the lowest data rate of these modulation and coding schemes requires approximately 4 db SNR to achieve a 10-5 bit error rate (BER) on an additive white Gaussian noise (AWGN) channel. It may be desirable for a PRIME system to operate at a lower SNR. In order to function at a lower SNR, the PRIME system requires more robust modulation and coding schemes (MCS), which may consequently reduce the data rate of the system.

According to some embodiments, the MCS set may be enhanced by adding a repetition code at the output of the convolutional code. For example, PHY transmitter 800 of FIG. 8 includes operations 801, 802, and 804-808 that may be similar to operations 701-707 in some aspects. In addition to those operations, however, PHY transmitter 800 also includes a bit-level repetition code operation 803 at the output of the convolutional encoder 802. In various implementations, each bit within the bitstream output by convolutional encoder 802 may be repeated N times (i.e., a repetition N code). For example, N may be 2 such that, for instance, the input stream 0, 1, 0, 1, 0 may be output by block 803 as 0, 0, 1, 1, 0, 0, 1, 1, 0, 0. In some cases, such a bit-level repetition code may yield a 3 dB SNR improvement on an AWGN channel, and may provide a higher level of enhancement for other channel profiles. One advantage of the transmitter embodiment shown in FIG. 8 is that it is simple to implement. With minimal changes to the existing PRIME standard, the repetition code can be added to the existing PRIME PHY transmitter. Also, in alternative embodiments, bit-level repetition code 803 may be placed between interleaver 805 and subcarrier modulator 806.

Considering that PRIME uses differential PSK for its modulation schemes, the receiver may have to first perform differential demodulation and log-likelihood ratio (LLR) combining, and may lose SNR because of noise enhancement during differential demodulation process. To address these and other concerns, embodiments discussed below with respect to FIGS. 9-12 may employ a repetition code that operates upon symbols rather than bits, each symbol representing or conveying two or more bits of data. For example, the current PRIME system supports up to 63 OFDM symbols, where each OFDM symbol in the payload carries 96 data subcarriers and 1 pilot subcarrier—i.e., there are 97 tones per one OFDM symbol.

For example, transmitter 900 of FIG. 9 includes convolutional encoder 902 coupled to CRC 901, interleaver 903 coupled to convolutional encoder 902, subcarrier modulator 904 coupled to interleaver 903, symbol-level repetition code 905 coupled to subcarrier modulator 904, scrambler 906 coupled to symbol-level repetition code 905, IFFT 907 coupled to scrambler 906, and cyclic prefix 908 coupled to IFFT 907. Accordingly, upon receiving a signal to be transmitted over a power line, transmitter 900 may apply convolutional encoding 902 to the received signal to produce an encoded signal, interleave 903 the encoded signal to produce an interleaved signal, perform a subcarrier modulation operation 904 upon the interleaved signal to produce a modulated signal, apply symbol-level repetition coding 905 upon the modulated signal to produce a repetitious signal, scramble 906 the repetitious signal, and cause the repetitious signal to be transmitted over the power line.

As illustrated in FIG. 11, a first set of symbols 1101 includes symbols S1(1) though S1(97) and a second set of symbols 1102 (occurring later in time than the first set of symbols 1101) includes symbols S2(1) though S2(97). More generally, where Si(j) is used herein to refer to a modulated sample at the j-th tone at the i-th symbol, where Si(1) is the pilot for the i-th symbol. In some embodiments, symbol-level repetition code 905 may apply a repetitive pattern to a first set of symbols 1101 within the modulated signal for an N number of times—where N is an integer; and also apply the same repetitive pattern to the second set of symbols 1102 for the same N number of times. As such, when N=4, the resulting repetitious signal may include a first portion 1103 where symbols S1(1) though S1(97) are repeated four times, and a second portion 1104 where symbols S2(1) though S2(97) are repeated the same number of times. In alternatively embodiments, a different repetitive pattern may be applied to the first and second sets of symbols, respectively.

With symbol-level repetition code set to N (i.e., rate 1/N), symbols may be repeated N times consecutively, which means pilot tones S are also copied and the repeated symbols go into scrambler 906. Scrambling 906 may be performed at sample level, for example, in cases where the symbols may be hit by impulse noise and the repetition at the symbol level offers more time diversity. At the receiver, respective samples Si(j) may be coherently combined at the FFT output. (Channel coherence time—i.e., the period over which the channel changes in time—is generally sufficiently large.) Accordingly, coherent combination of the received symbols may increase the relaibility of samples, and the combined symbols may then be differentially demodulated.

When a data concentrator (e.g., 114 in FIG. 1) or the base node in each PLC domain is tied to a common clock through the backbone (e.g., Ethernet or DSL), the seed (i.e., the initial states of the scrambling code used in scrambler 906) may be tied to the domain ID, thus causing a slightly different scrambler shift to be used in the different domains. The combination of repetition coding and the scrambler shift tied to the domain ID, as described herein, may allow more protection if presence of interfering networks. Conversely, if the data concentrators or base nodes in each respective domain are not tied to a common clock (or, more generally, as in G3 networks where there is no base node or concentrator), the techniques described herein may still be used, for example, with the original scrambling code seed defined in the PRIME specification. In various implementations, it is unlikely that the code shifts in the scrambling code may get aligned in any two random networks.

To increase frequency diversity in some implementations, if N>2, different repetitive patterns may be applied to different portions of the same set of symbols. For example, if N=4, a first portion of a first set of repeated symbols and a first portion of a second set of repeated symbol (S1 and S2) may be the same as in FIG. 11, while a second portion of the first set of repeated systems and a second portion of the second set of repeated symbols may be permutated with a different repeating pattern. At the receiver, coherent combining may be achieved two symbols, differentially decoded, and can be combined again after the differential decoding.

Particularly, FIG. 12 shows, similarly as in FIG. 11, a first set of symbols 1201 includes symbols S1(1) though S1(97) and a second set of symbols 1202 (occurring later in time than the first set of symbols 1101) includes symbols S2(1) though S2(97). In this alternative embodiment, symbol-level repetition code 905 may apply a first repetitive pattern to a first portion of a first set of repeated symbols 1203 (repeated for an N number of times, where N is an integer), apply a second repetitive pattern to a second portion of the first set of repeated symbols 1204, apply the first repetitive pattern to a first portion of a second set of repeated symbols 1205, and apply the second repetitive pattern to a second portion of the second set of repeated symbols 1206. In this case, {N1, N2, ..., N97} is a different permutation of {1, 2, ..., 97}. That is, in various implementations, the second repetitive pattern may be different from the first repetitive pattern.

In some embodiments, in order to allow coherent combining of the respective bits in the repeated symbols, scrambler 906 (or 1003) may be "frozen" for the repetition symbols. That means, the scrambling used on a given symbol may be repeated for the repetitions of that symbol.

In another embodiment, transmitter 1000 of FIG. 10 includes convolutional encoder 1002 coupled to CRC 1001, scrambler 1003 coupled to convolutional encoder 1002, interleaver 1004 coupled to scrambler 1003, subcarrier modulator 1005 coupled to interleaver 1004, repetition code 1006 coupled to subcarrier modulator 1005, IFFT 1007 coupled to symbol-level repetition code 1006, and cyclic prefix 1008 coupled to IFFT 1007. Accordingly, upon receiving a signal to be transmitted over a power line, transmitter 1000 may apply convolutional encoding 1002 to the received signal to produce an encoded signal, scramble 1003 the encoded signal to produce as scrambled signal, interleave 1004 the scrambled signal to produce an interleaved signal, perform a subcarrier modulation operation 1005 upon the interleaved signal to produce a modulated signal, apply symbol-level repetition coding 1006 upon the modulated signal to produce a repetitious signal, and cause the repetitious signal to be transmitted over the power line.

In FIG. 10, because sub-carrier modulator 1005 is implemented after scrambler 1003 (in contrast with FIG. 9 where modulator 904 is placed before scrambler 906), pilot bits may also be "frozen" for the repeated symbols. In other words, pilot bits inserted for the repeated symbols may hold the same values—i.e., if the pilot bit in a given symbol is pi={0, 1} then the same pilot bit value may be employed in the repetition of that symbol.

FIG. 13 is a diagram of a data frame according to some embodiments. Particularly, the data frame includes preamble 1301, header 1302, and payload 1304 portions. In some implementations, one or more bits 1303 within header 1302 may be used to indicate the symbol-level repetition mode used in the transmission of a PLC signal. For example, when the technique illustrated in FIG. 11 is used, bit(s) 1303 may indicate a particular value (e.g., "0"), and when the technique of FIG. 12 is employed, bit(s) 1303 may hold a different value (e.g., "1").

It will be understood that various operations illustrated in connection with FIGS. 1-13 may be executed simultaneously and/or sequentially. It will be further understood that each operation may be performed in any order and may be performed once or repetitiously. In various embodiments, the blocks shown in FIGS. 8-10 may represent sets of software routines, logic functions, and/or data structures that are configured to perform specified operations. Although these modules are shown as distinct logical blocks, in other embodiments at least some of the operations performed by these modules may be combined in to fewer blocks. Conversely, any given one of the blocks shown in FIGS. 8-10 may be implemented such that its operations are divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A power line communication (PLC) device comprising:
a processor; and
a memory coupled to the processor, the memory configured to store program instructions executable by the processor to cause the PLC device to:
receive a signal;
apply convolutional encoding to the received signal, the convolutional encoding producing an encoded signal;
perform a subcarrier modulation operation upon the encoded signal, the subcarrier modulation operation producing a modulated signal;
apply symbol-level repetition coding to the modulated signal, the symbol-level repetition coding producing a repetitious signal;
scramble the repetitious signal; and
cause the repetitious signal to be transmitted over a power line.

2. The PLC device of claim 1, wherein the processor includes a digital signal processor (DSP), an application specific integrated circuit (ASIC), a system-on-chip (SoC) circuit, a field-programmable gate array (FPGA), a microprocessor, or a microcontroller.

3. The PLC device of claim 1, wherein the program instructions are further executable by the processor to cause the PLC device to:
interleave the encoded signal to produce an interleaved signal prior to performing the subcarrier modulation operation, the subcarrier modulation operation being performed upon the interleaved signal.

4. The PLC device of claim 3, wherein to scramble the repetitious signal, the program instructions are further executable by the processor to cause the PLC device to:
apply a scrambler shift corresponding to a PLC domain where the PLC device is located, the scrambler shift different from another scrambler shift corresponding to another PLC domain.

5. The PLC device of claim 1, wherein to apply the symbol-level repetition coding to the modulated signal, the program instructions are executable by the processor to cause the PLC device to:
apply a repetitive pattern to a first set of symbols within the modulated signal for an N number of times, wherein N is an integer; and
apply the repetitive pattern to a second set of symbols within the modulated signal for the N number of times, the second set of symbols occurring later in time than the first set of symbols.

6. The PLC device of claim 1, wherein to apply the symbol-level repetition coding to the modulated signal, the program instructions are executable by the processor to cause the PLC device to:
apply a first repetitive pattern to a first portion of a first set of repeated symbols;
apply a second repetitive pattern to a second portion of the first set of repeated symbols, the second portion of the first set of repeated symbols occurring later in time than the first portion of the first set of repeated symbols;
apply the first repetitive pattern to a first portion of a second set of repeated symbols, the first portion of the second set of repeated symbols occurring later in time than the second portion of the first set of repeated symbols; and
apply the second repetitive pattern to a second portion of the second set of repeated symbols, the second portion of the second set of repeated symbols occurring later in time than the first portion of the second set of repeated symbols, and the second repetitive pattern different from the first repetitive pattern.

7. A method comprising:
performing, by a power line communication (PLC) device, applying convolutional encoding to a PLC signal, the convolutional encoding producing an encoded signal;
interleaving the encoded signal to produce an interleaved signal prior to performing the subcarrier modulation operation;
performing a subcarrier modulation operation upon the encoded interleaved signal, the subcarrier modulation operation producing a modulated signal; and
applying repetition coding to the modulated signal, the repetition coding producing a repetitious signal;
scrambling the repetitious signal using a scrambler shift corresponding to a PLC domain where the PLC device is located, the scrambler shift different from another scrambler shift corresponding to another PLC domain.

8. The method of claim 7, wherein applying the repetition coding further comprises:

applying a first repetitive pattern to a first set of symbols within the modulated signal; and applying a second repetitive pattern to a second set of symbols within the modulated signal, the second set of symbols occurring later in time than the first set of symbols, and the second repetitive pattern different from the first repetitive pattern.

9. The method of claim 7, wherein applying the repetition coding further comprises:

applying a first repetitive pattern to a first portion of a first set of repeated symbols;

applying a second repetitive pattern to a second portion of the first set of repeated symbols, the second portion of the first set of repeated symbols occurring later in time than the first portion of the first set of repeated symbols;

applying the first repetitive pattern to a first portion of a second set of repeated symbols, the first portion of the second set of repeated symbols occurring later in time than the second portion of the first set of repeated symbols; and applying the second repetitive pattern to a second portion of the second set of repeated symbols, the second portion of the second set of repeated symbols occurring later in time than the first portion of the second set of repeated symbols, and the second repetitive pattern different from the first repetitive pattern.

10. A non-transitory computer-readable medium having program instructions stored thereon that, upon execution by a power line communication (PLC) device, cause the PLC device to:

apply convolutional encoding to a PLC signal, the convolutional encoding producing an encoded signal;

interleave the encoded signal to produce an interleaved signal;

perform a subcarrier modulation operation upon the interleaved signal, the subcarrier modulation operation producing a modulated signal;

scrambling the repetitious signal prior to transmitting the repetitious signal over the power line;

apply symbol-level repetition coding to the modulated signal, the symbol-level repetition coding producing a repetitious signal; and transmit the repetitious signal over a power line.

11. The non-transitory computer-readable storage medium of claim 10, wherein to apply the symbol-level repetition coding, the program instructions, upon execution by the PLC device, further cause the PLC device to:

apply a first repetitive pattern to a first set of symbols within the modulated signal; and apply a second repetitive pattern to a second set of symbols within the modulated signal, the second set of symbols occurring later in time than the first set of symbols, and the second repetitive pattern different from the first repetitive pattern.

12. The non-transitory computer-readable storage medium of claim 10, wherein to apply the symbol-level repetition coding, the program instructions, upon execution by the PLC device, further cause the PLC device to:

apply a first repetitive pattern to a first portion of a first set of repeated symbols;

apply a second repetitive pattern to a second portion of the first set of repeated symbols, the second portion of the first set of repeated symbols occurring later in time than the first portion of the first set of repeated symbols;

apply the first repetitive pattern to a first portion of a second set of repeated symbols, the first portion of the second set of repeated symbols occurring later in time than the second portion of the first set of repeated symbols; and apply the second repetitive pattern to a second portion of the second set of repeated symbols, the second portion of the second set of repeated symbols occurring later in time than the first portion of the second set of repeated symbols, and the second repetitive pattern different from the first repetitive pattern.

* * * * *